(12) United States Patent
Krapfl et al.

(10) Patent No.: US 6,484,835 B1
(45) Date of Patent: Nov. 26, 2002

(54) AIR CLEANER AND HOOD DUCTING ARRANGEMENT

(75) Inventors: Christopher Charles Krapfl, Cascade, IA (US); Wayne Russel Miller, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/449,289

(22) Filed: Nov. 24, 1999

(51) Int. Cl.$^7$ ................................................ B60R 22/20
(52) U.S. Cl. ...................... 180/68.3; 123/195 C; 55/404
(58) Field of Search ............................ 180/68.1, 68.2, 180/68.3, 69.2; 123/195 C; 55/404, 405, 406

(56) References Cited

U.S. PATENT DOCUMENTS

| | | | | |
|---|---|---|---|---|
| 3,737,002 A | * | 6/1973 | Yotsumoto | 180/68.3 |
| 4,013,137 A | * | 3/1977 | Petersen | 180/68.3 |
| 4,215,665 A | * | 8/1980 | Stambaugh | 123/195 C |
| 4,327,680 A | | 5/1982 | Dauwalder | 123/195 C |
| 4,338,890 A | | 7/1982 | Shelby et al. | 123/195 A |
| 4,354,458 A | | 10/1982 | Bury | 123/52 M |
| 4,932,490 A | * | 6/1990 | Dewey | 180/68.3 |
| 5,193,636 A | | 3/1993 | Holm | 180/68.1 |
| 5,618,323 A | * | 4/1997 | Shearn et al. | 180/68.3 X |
| 5,656,050 A | | 8/1997 | Moredock | 55/394 |

* cited by examiner

Primary Examiner—Kenneth R. Rice
Assistant Examiner—Christopher Buchanan

(57) ABSTRACT

A vehicle having an air pre-cleaner coupled with an engine enclosure such that the air inlet to the air pre-cleaner is positioned beneath the top wall of the engine enclosure and receives air from a duct within the enclosure, and the debris outlet of the air pre-cleaner is located above the top wall of the engine enclosure.

6 Claims, 3 Drawing Sheets

AIR CLEANER AND HOOD DUCTING ARRANGEMENT

BACKGROUND OF THE INVENTION

This invention relates to off road vehicles having air cleaners or pre-cleaners coupled with the vehicle's internal combustion engine.

It is known to provide off road work vehicles such as loader backhoes with large air intake pipes that extend upwardly from the vehicle hood. These vehicles generate a large amount of dust and airborne debris as the wheels contact the ground. The air proximate the ground and tires tends to contain large quantities of dirt and debris. Also, the engine cooling fan located proximate the engine within the engine enclosure tends to generate dust and airborne debris. The pipes extend high above the hood so that relatively clean air can be pulled into the pipe. These pipes often have the disadvantage of being positioned directly in front of the vehicle operator station, and therefore can block or obstruct the operator's forward view from the operator station.

It is also known to provide off road work vehicles with an air intake pipe having a pre-cleaner mounted to the top of the pipe. One type of pre-cleaner includes propeller blades that rotate as air is drawn through the pre-cleaner for use by the engine. Rotation of the blades imparts a centrifugal force to the air and debris. The airborne debris is heavier than the surrounding air, and the centrifugal force imparted to the debris propels the debris outwardly through a debris outlet. The air is thereby cleaned of heavy debris and airborne dirt, and the air remaining within the pre-cleaner is pulled downwardly through the intake pipe for use by the internal combustion engine. Air intake pipes having pre-cleaners mounted on the top of the intake pipe also have the disadvantage of blocking the seated operator's view from within the operator station.

It would therefore be desirable to provide an air intake mechanism that would generally not obstruct the view of the operator during operation of an off road work vehicle. It would also be desirable for such a mechanism to direct relatively clean air toward the vehicle's internal combustion engine.

SUMMARY OF THE INVENTION

The preferred embodiment of the present invention provides an off road work vehicle having an internal combustion engine positioned within an engine enclosure. An air pre-cleaner is fixed with the engine enclosure and serves to direct cleaned air to the engine to facilitate combustion within the engine. The air pre-cleaner includes fan blades which rotate to propel airborne debris radially outwardly with centrifugal force so that relatively heavy airborne debris is expelled from the pre-cleaner through a debris outlet near the upper portion of the air cleaner. The debris outlet is formed in a cap of the pre-cleaner and is located above a top surface of the engine enclosure. The pre-cleaner includes an air inlet positioned beneath the debris outlet and located within the engine enclosure. The air pre-cleaner defines a clean air outlet through which cleaned air from the air pre-cleaner passes to the engine. Ducts positioned within the engine enclosure direct air toward the air inlet of the air pre-cleaner. A duct inlet is formed in the engine enclosure for directing air from the exterior of the engine enclosure into the duct.

DESCRIPTION OF THE PREFERRED EMBODIMENT

Figure 1:
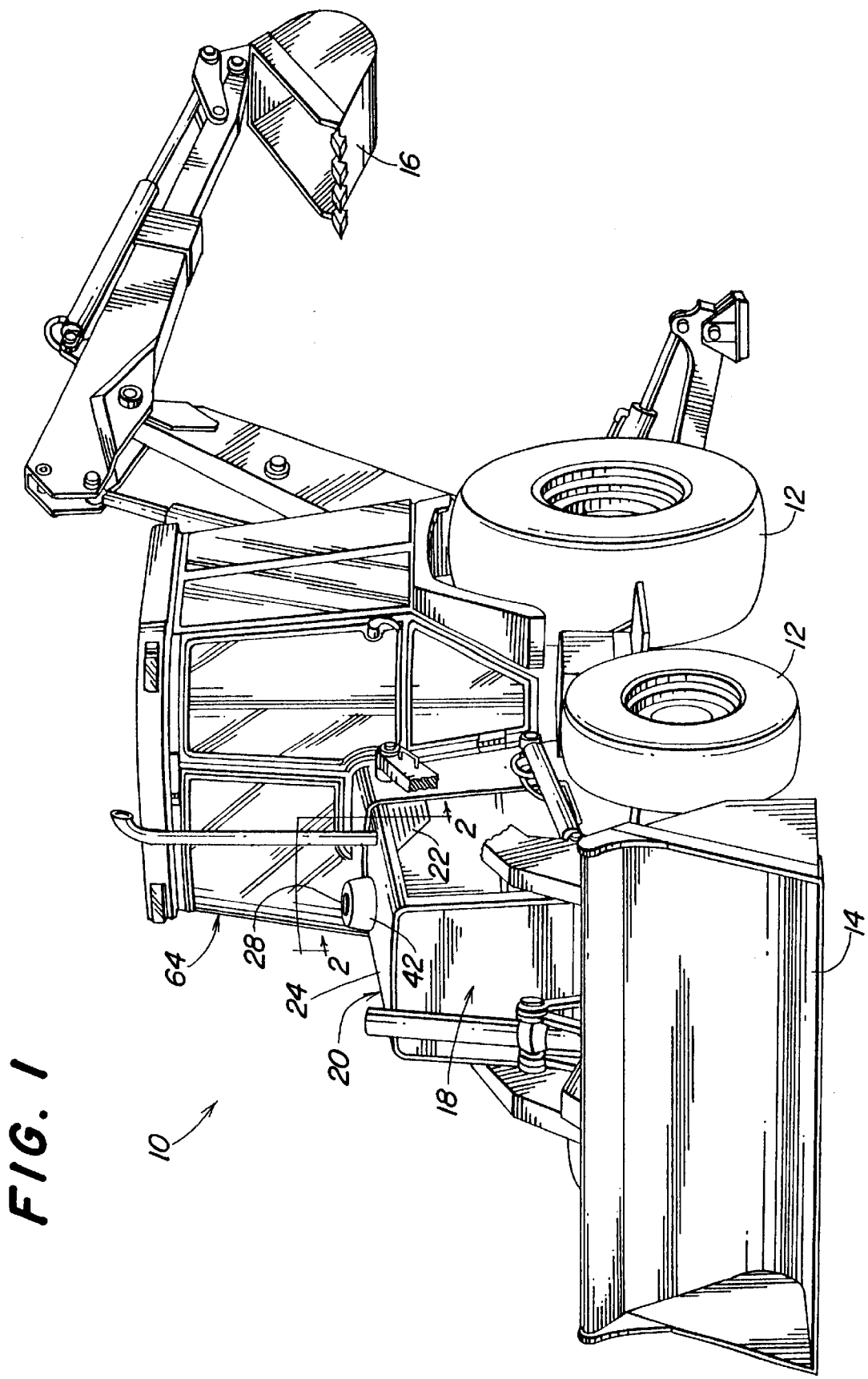
FIG. 1 is a perspective view of an off road work vehicle according to the preferred embodiment of the present invention.
Figure 2:
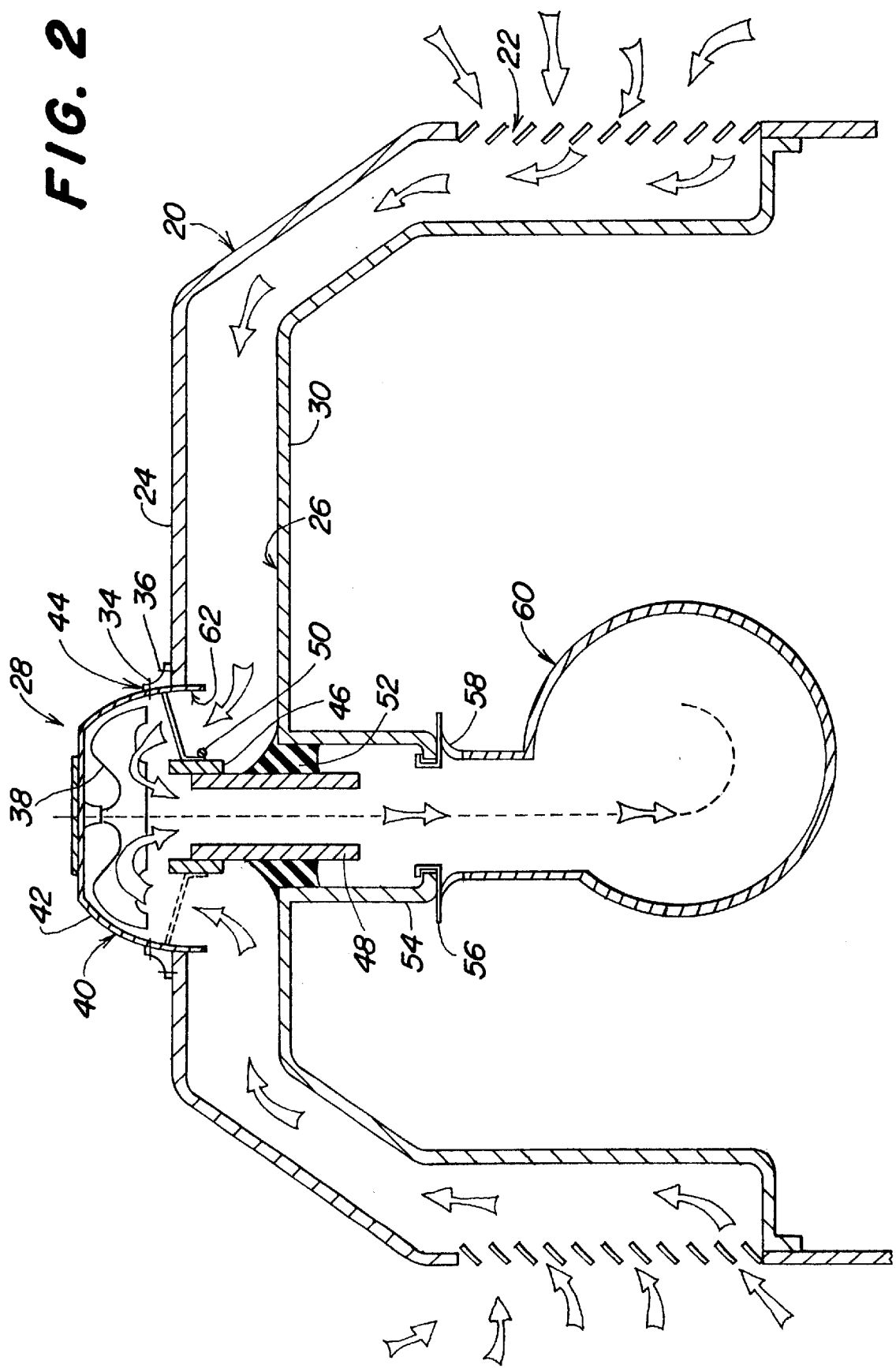
FIG. 2 is a partial cross-sectional view taken through the pre-cleaner, engine enclosure and ducts.
Figure 3:
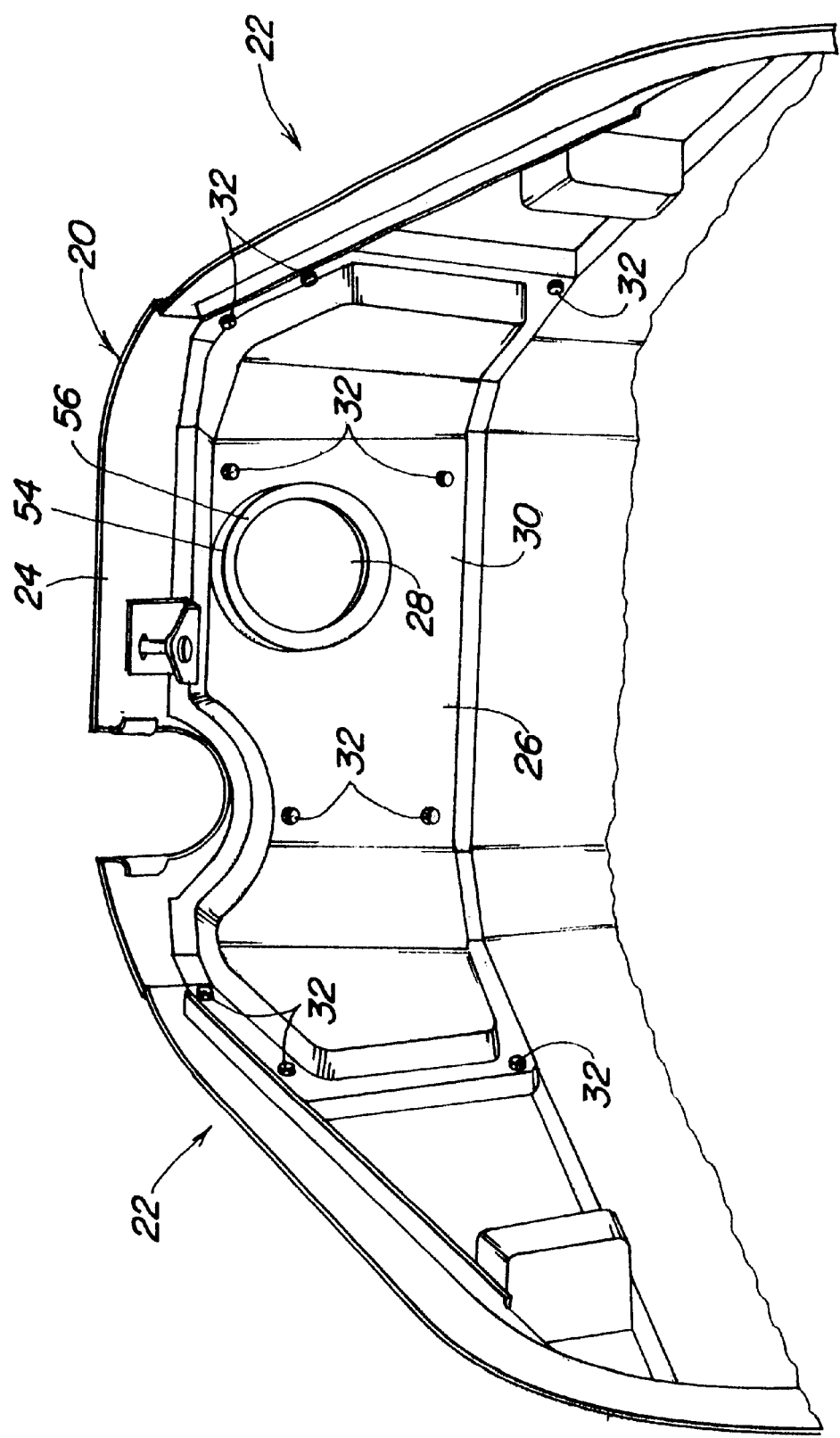
FIG. 3 is a partial perspective view of the underside of the engine enclosure showing the engine enclosure in an opened, raised position.

Referring now to FIGS. 1–3, there is shown the preferred embodiment of the present invention. An off road work vehicle 10 such as a loader backhoe includes ground engaging tires 12, a loader bucket 14 and a backhoe 16. The vehicle 10 includes an internal combustion engine 18 at the front of the vehicle 10 positioned within an engine enclosure or hood 20. The engine enclosure 20 includes grills or duct inlets 22 on each side of the engine enclosure 20. The top wall 24 of the engine enclosure 20 is a molded plastic material and defines the top wall of a duct 26 that directs air from the duct inlets 22 to an air cleaner or pre-cleaner 28 coupled with the engine enclosure 20. The lower wall 30 of the duct 26 is defined by a molded plastic part that is fixed as by bolts 32 to the underside of the top wall 24 of the engine enclosure 20.

The air pre-cleaner 28 is fixed as by bolts 34, 36 to the top wall 24 of the engine enclosure 20. The air pre-cleaner 28 utilizes centrifugal force to separate relatively heavy dirt and debris from the lighter air. Fan blades 38 rotate about the central axis of the air pre-cleaner 28 as the air is drawn into the air pre-cleaner 28 from the air ducts 26 due to the suction created by the internal combustion engine 18. As the fan blades 38 turn they direct air and debris outwardly. The relatively heavy debris is discharged out of the air pre-cleaner 28 through a debris outlet opening 40 formed in the cap 42 of the air pre-cleaner 28. The relatively light air remaining within the air pre-cleaner 28 is then drawn downward toward the engine 18 to facilitate combustion. This type of air pre-cleaner 28 is generally shown and described in more detail in U.S. Pat. No. 5,656,050, which is hereby incorporated by reference.

A ring 44 is positioned around the cap 42 of the air pre-cleaner 28. Horizontally oriented bolts 34 extend through the cap 42 and ring 44 for fixing the cap 42 to the ring 44. Vertically oriented bolts 36 extend through the ring 44 and the top wall 24 of the engine enclosure 20 for fixing the ring 44 to the enclosure 20. The ring 44 and bolts 34, 36 thereby serve to fix the cap 42 and air pre-cleaner 28 to the engine enclosure 20.

The pre-cleaner 28 includes a plastic clean air outlet tube 46 located along the centerline of the pre-cleaner 28. The clean air outlet tube 46 serves as a clean air outlet for the pre-cleaner 28. Clean air from the air pre-cleaner 28 passes through the clean air outlet tube 46, and into an extension tube 48. A worm gear clamp 50 holds the clean air outlet tube 46 securely against the extension tube 48. The extension tube 48 is received within an elastomeric seal 52 that is press fit and bonded to the lower wall 30 of the duct. A downwardly extending snout 54 is formed in the lower wall 30 of the duct 26 and receives clean air from the extension tube 48. A mating plate member 56 is fixed with the lower end of the snout 54 to establish a flat surface to abut against a seal 58 fixed with the engine air cleaner 60.

During operation of the off road vehicle 10, air is drawn into the duct inlets 22 located at each side of the engine enclosure 20. The air travels through the duct 26 between the top wall 24 of the enclosure 20 and the bottom wall 30 of the duct 26. The air enters the air inlet 62 of the pre-cleaner 28 and rotates the fan blades 38. The fan blades 38 impart centrifugal force to the air and airborne debris. The debris is generally expelled from the pre-cleaner 28 through an opening 40 formed in the pre-cleaner cap 42. The relatively clean air remaining in the pre-cleaner 28 is pulled downwardly through the clean air outlet tube 46, the extension tube 48, the snout 54, and the mating plate 56 and into the engine air cleaner 60.

When the operator opens the engine enclosure or hood 20 to access the engine 18, the top wall 24 of the enclosure 20 and the bottom wall 30 of the duct 26 pivot together. The pre-cleaner 28 remains fixed with the engine enclosure 20 and therefore also pivots with the enclosure 20. When the operator closes the enclosure 20 the pre-cleaner 28, top wall 24, bottom wall 30 of the duct 26, and mating plate 56 pivot together as a unit. The mating plate 56 will pivot down with the hood 20 and into abutment with the seal 58 to thereby establish a closed route or conduit for air to travel from the pre-cleaner 28 to the engine air cleaner 60.

The preferred embodiment of the present invention positions the pre-cleaner 28 such that the air inlet 62 of the pre-cleaner 28 is positioned beneath the top wall 24 of the enclosure 20. The duct 26 serves to direct air from the exterior of the enclosure 20 to the pre-cleaner's air inlet opening 62. The pre-cleaner 28 is coupled with the top wall 24 of the enclosure 20 such that the cap 42 extends upwardly above the top wall 24. Therefore, the debris outlet 40 of the pre-cleaner 28 is positioned above the top wall 24 of the enclosure 20 such that debris is expelled outwardly through the debris outlet 40 directly into the atmosphere at a location above the engine enclosure 20. The position of the cap 42 and debris outlet 40 above the top wall 24 of the engine enclosure 20 eliminates the need for ducting or other mechanisms that would route air and debris from the debris outlet 40 to the atmosphere if the cap 42 were positioned beneath the top wall 24 of the engine enclosure 20.

The preferred embodiment of the present invention positions the pre-cleaner 28 such that the cap 42 of the pre-cleaner 28 only extends a small distance above the top wall 24 of the engine enclosure 20. Therefore, the position of the pre-cleaner 28 establishes a relatively low profile on the engine enclosure 20 and generally does not obstruct the view of the operator seated in the operator station 64. The air intake routing system according to the present invention eliminates the tall intake pipe that would otherwise block the operator's view from the operator station 64.

The pre-cleaner 28 is coupled with the engine enclosure 20 and therefore pivots with the engine enclosure 20 as the enclosure 20 is pivoted between its opened and closed positions. Since the pre-cleaner 28 is operatively fixed with the enclosure 20 during operation there is no need for the enclosure 20 to provide clearance for a stationary air intake pipe that remains in fixed position with respect to the engine 18. The design of the enclosure 20 and air intake passageway is thereby simplified.

We claim:

1. A vehicle, comprising:
   an internal combustion engine carried by the vehicle,
   an engine enclosure which generally encloses the engine,
   an air pre-cleaner that cleans air and directs the cleaned air to the engine to facilitate combustion within the engine, said air pre-cleaner having blades which rotate to propel airborne debris radially outwardly due to centrifugal force imparted to the debris, said air pre-cleaner includes a debris outlet near the upper portion of the air cleaner and located above a top surface of the engine enclosure, and an air inlet positioned beneath the debris outlet and located within the engine enclosure, an air outlet through which cleaned air from the air pre-cleaner passes to the engine is defined by the air pre-cleaner,
   said air pre-cleaner further comprises a clean air outlet tube having an upper edge over which air flowing upwardly from the air inlet must pass to begin flowing downwardly toward the engine, said upper edge of the clean air outlet tube being positioned at generally the same elevation as a top surface of the engine enclosure proximate the air pre-cleaner,
   at least one duct positioned within the engine enclosure and through which air is directed toward the air inlet of the air pre-cleaner,
   a duct inlet formed in the engine enclosure for directing air from the exterior of the engine enclosure into the duct.

2. The vehicle of claim 1, wherein the duct inlet is positioned on the side of the engine enclosure.

3. The vehicle of claim 1, wherein the vehicle is an off road work vehicle.

4. The vehicle of claim 1, wherein the air pre-cleaner is coupled with the engine enclosure, and shifts therewith when the enclosure is shifted between opened and closed positions.

5. A vehicle comprising:
   an internal combustion engine carried by the vehicle,
   an engine enclosure which generally encloses the engine,
   a pre-cleaner that cleans air and directs the cleaned air to the engine to facilitate combustion within the engine, said pre-cleaner having blades which rotate to propel airborne debris radially outwardly due to centrifugal force imparted to the debris, said pre-cleaner includes a debris outlet near the upper portion of the pre-cleaner, and an air inlet positioned beneath the debris outlet, said pre-cleaner further comprising a clean air outlet tube having an upper edge over which air flowing upwardly from the air inlet must pass to begin flowing downwardly toward the engine, said upper edge of the clean air outlet tube being positioned at generally the same elevation as a top surface of the engine enclosure proximate the air pre-cleaner, and
   wherein the pre-cleaner is coupled with the engine enclosure, and shifts therewith when the enclosure is shifted between opened and closed positions.

6. The vehicle of claim 5, and further comprising:
   at least one duct positioned within the engine enclosure and through which air is directed toward the air inlet of the pre-cleaner, and
   a duct inlet defined in the enclosure for directing air from the exterior of the engine enclosure into the duct.

* * * * *